United States Patent [19]

Forry et al.

[11] Patent Number: 5,276,082
[45] Date of Patent: Jan. 4, 1994

[54] HALOGEN-FREE FLOOR COVERING

[75] Inventors: John S. Forry, Lancaster; Susan M. Von Stetten, Landisville, both of Pa.

[73] Assignee: Armstrong World Industries, Inc., Lancaster, Pa.

[21] Appl. No.: 873,616

[22] Filed: Apr. 22, 1992

Related U.S. Application Data

[63] Continuation of Ser. No. 552,158, Jul. 13, 1990, abandoned.

[51] Int. Cl.$^5$ .............................................. C08L 51/00
[52] U.S. Cl. ................................... 524/504; 524/500; 524/914; 525/72; 525/100; 525/209; 525/185; 525/189; 525/190; 525/474; 525/479; 525/536; 525/539; 428/44
[58] Field of Search ................. 525/72, 100, 209, 185, 525/189, 190, 536, 539; 524/504, 914, 500

[56] References Cited

U.S. PATENT DOCUMENTS 4,618,654  10/1986  Schmidtchen .................... 525/288
4,722,961   2/1988  Topcik ............................... 524/504

FOREIGN PATENT DOCUMENTS 2546172  11/1984  France ................................ 525/72
62-015252  1/1987  Japan ................................. 525/72

Primary Examiner—Ralph H. Dean

[57] ABSTRACT

A surface covering including a blend of a silane-grafted ethylene/vinyl acetate polymer and an ungrafted thermoplastic polymer retains the desirable balance between indentation, tensile strength and elongation of a fully grafted EVA while permitting the reprocessibility of scrap material. Preferably, the silane graft density is one graft per about 100 carbons to one graft per about 5,000 carbons. The preferred EVA has about 18% to about 28% vinyl acetate.

11 Claims, No Drawings

HALOGEN-FREE FLOOR COVERING

This application is a continuation of application Ser. No. 552,158, filed Jul. 13, 1990, now abandoned.

FIELD OF THE INVENTION

This invention relates to surface coverings including floor coverings. In particular, the invention is directed to surface coverings which are halogen-free, and more specifically, surface coverings including a blend of a silane grafted polymer and an ungrafted polymer.

BACKGROUND OF THE INVENTION

Resilient floor products have to meet a variety of performance requirements such as abrasion resistance, dimensional stability and gouge resistance. Of particular concern to a materials scientist are the resistance to indentation and flexibility requirements. These requirements can be particularly troublesome because in many instances improvements to indentation performance must be made at the expense of reduced flexibility.

Filled thermoset rubbers have been able to provide a good balance of these properties because the crosslinking provides good compression set resistance by providing a high degree of elasticity such that even if the product is quite flexible and relatively soft enough to allow significant indentation there is a high percent recovery. However, there are several disadvantages to these products. Firstly, the required raw materials produce a yellowish color that prevents the easy development of some light colors and prohibits the development of others. Secondly, the manufacturing procedures require an undesirably long cure step. Thirdly, the fact that the final product is thermoset means that there can be no reuse of out of specification material. Fourthly, there is a high level of smoke evolved during the combustion that might occur in a fire situation.

For the preparation of resilient flooring the most frequently used polymers are polyvinyl chloride (PVC) and vinyl chloride copolymers, principally copolymers of vinyl chloride and vinyl acetate. The art of compounding and processing PVC-based compositions is well understood. The processing and forming of PVC-based compositions is greatly facilitated by the use of plasticizing additives. Esters of phthalic acid, such as di-2-ethylhexyl phthalate (DOP), are commonly used. The use of such plasticizing additives also facilitates the incorporation of high levels (up to about 90% by weight) of fillers and pigments, and affords finished compositions with an acceptable degree of flexibility and resiliency. PVC resins generally require the use of stabilizing additives to prevent discoloration resulting from thermally induced decomposition of the resin during processing. The use of stabilizing additives also helps to prolong the useful life of a PVC-based product by continuing to prevent degradation induced by heat or by light during the service life of the product. These stabilizing additives typically include metal containing compounds such as the barium, zinc, and cadmium salts of organic acids (e.g., stearic acid) and organotin compounds.

The necessary use of these additive materials can create a variety of undesirable problems in composite flooring structures. As one example, in a flooring structure in which a plasticized PVC composition is protected by a clear unplasticized coating, migration of the plasticizer from the PVC composition into the protective clear coating can soften the coating and thereby lessen its protective capabilities.

A second undesirable situation arises from the need to use metal-containing additives. It has been alleged that the forced combustion of PVC-based compositions, as in an incinerator, results in the creation of volatile and hazardous metal-containing pollutants.

Other undesirable conditions are also created when PVC-based compositions burn as might occur in a fire situation. The combustion of such materials can result in the evolution of dense smoke which can contribute to a hazardous condition at times when visibility is important. Furthermore, halogen-containing products of combustion, such as hydrogen chloride, can be formed, thereby adding a further element of hazard to a fire situation.

Ethylene/vinyl-acetate (EVA) copolymers have been successfully employed in the preparation of hot melt adhesives, sealants and a variety of coatings. U.S. Pat. No. 4,430,468 describes the modification of filled EVAs with surfactants to provide a high level of flexibility. EVA compositions have been formed into sheets, but such sheets did not have physical properties comparable to PVC flooring, particularly indentation resistance and reprocessibility.

More recently cross-linkable EVAs have been produced through the use of silane-grafting. These polymers have been used in the wire and cable industry to provide non-halogen, low smoke sheathing. In this industry the EVA is fully cross-linked to provide the greatest degree of fire resistance and highest temperature in use performance.

SUMMARY OF THE INVENTION

This invention consists of new compositions suitable for use in the preparation of resilient flooring products. They are particularly suited for, but not restricted to, floor products in sheet form. The compositions utilize copolymers of ethylene and vinyl acetate, silane-grafted copolymers of ethylene, vinyl acetate, and terpolymers of ethylene, vinyl acetate and carbon monoxide or methacrylic acid. These polymers or various blends of these polymers are compounded with fillers such as calcium carbonate, clays, aluminum hydroxide (alumina trihydrate), talc, and mica and may include conventional pigments to provide desired colors. Low modulus synthetic thermoplastic polymers such as the terpolymer of ethylene, vinyl acetate and carbon monoxide may be used in relatively low amounts to increase the flexibility of the compositions. Common plasticizers such as di-2-ethylhexyl phthalate or butyl benzyl phthalate have been employed with varying degrees of compatibility. The filler type also influences the degree of compatibility.

These compositions are characterized by being halogen-free, thereby eliminating the potential for the formation of hydrogen chloride or other halogenated products of combustion when the compositions are burned. Additionally, the density of smoke evolved in a test such as the NBS Smoke Chamber is significantly lower for these compositions than that produced when comparable PVC-based compositions are similarly tested.

These compositions are further characterized by an absence of stabilizing additives containing metals such as tin, zinc, cadmium, barium, and the like. The absence of such stabilizing additives means that combustion products derived therefrom cannot enter the environment.

Furthermore, preferred embodiments of this invention contain no liquid plasticizing compounds such as di-2-ethylhexyl phthalate. Thus, undesirable phenomena, such as plasticizer migration or volatile emissions, do not occur.

The blended silane-grafted and ungrafted polymer compositions of this invention provide a reprocessible partially cross-linked floor product that eliminates the hazardous products of combustion and significantly reduces the degree of smoke evolution associated with previous floor products.

According to the present invention there is provided a surface covering comprising a composition including (a) from about 1% to about 50% by weight of at least one copolymer of ethylene with at least one non-ethylene monomer selected from the group consisting of vinyl esters of saturated carboxylic acids wherein the acid moiety has up to 4 carbon atoms, unsaturated mono- and dicarboxylic acids of 3 to 5 carbon atoms, salts of said unsaturated acids, and esters of said unsaturated acids wherein the alcohol moiety has 1 to 8 carbon atoms, the ethylene content of said copolymer being from about 40% to about 95% by weight, the non-ethylene monomer content of the copolymer being from about 5% to about 60% by weight, and the melt index of the copolymer being from about 0.1 to about 400, provided that when the copolymer of ethylene is an ethylene/vinyl ester or ethylene/unsaturated mono- or dicarboxylic acid ester copolymer the copolymer can contain up to about 15 percent by weight of carbon monoxide or sulfur dioxide;

(b) from about 1% to about 50% of at least one copolymer from paragraph (a) that has been functionalized with silane grafting of a frequency from about one graft per 100 carbons to about one graft per 5000 carbons;

(c) from 0% to about 5% of a Lewis acid catalyst;

(d) from 0% to about 50% by weight of olefin polymer selected from the group consisting of low density branched polyethylene, high density linear polyethylene, linear copolymers of ethylene and another olefin comonomer, polypropylene and copolymers of propylene and ethylene where the ethylene content is up to about 20% by weight;

(e) from 0% to about 50% by weight of elastomeric polymer;

(f) from about 30% to about 90% by weight of filler;

(g) from 0% to about 20% by weight of at least one plasticizer selected from the group consisting of processing oils, epoxidized oils, polyesters, polyethers and polyether esters;

(h) from 0% to about 5% by weight of at least one surface active agent; and (i) from 0% to about 10% by weight of at least one wax.

Further provided according to the present invention are the above compositions in the form of homogeneous flooring products.

Still further provided according to the present invention are non-homogeneous flooring products, especially those having a felt backing.

DETAILED DESCRIPTION OF THE INVENTION

This invention consists of halogen-free compositions of matter which have properties and functional characteristics equal or superior to the best poly(vinyl chloride) composition sheet flooring. The compositions contain mineral fillers, extenders, and pigments in amounts ranging from about 40 weight percent to about 80 weight percent, and preferably from about 55 weight percent to about 70 weight percent. They contain thermoplastic synthetic organic resins, singly or in combination, in amounts ranging from about 20 weight percent to about 60 weight percent, and preferably from about 30 weight percent to about 45 weight percent.

The individual ingredients in a formula may be weighed into a container and the contents of the container charged to an appropriate plastics compounding device. In the compounding device, the polymeric portion of the composition is plasticated and the mineral, or other components, are uniformly dispersed throughout the plastic melt. When the dispersion is complete, the homogeneous mass is transferred to the nip of a two-roll mill where it is passed between the mill rolls to form a sheet. Subsequently, the sheet may be passed between the rolls of one, or more, calendering devices to provide a smoother surface and to adjust the thickness of the sheet to a desired end value. The sheet may then be allowed to cool as necessary and rolled up, if the product is to be used in sheet form or, alternatively, tiles of a desired size and shape may be cut from it using a die or other convenient method.

Another processing sequence utilizes the mill sheet without any further plastic processing steps such as calendering. The sheet is comminuted into chips of desirable size by a cryogenic grinding operation. The temperature of the sheet must be below the Tg (glass transition temperature) for the compositions to be suitably brittle to permit ready reduction in size. Following grinding, the chips are screened to control the limits of the particle size distribution. The overs can be recycled for further size reduction and the unders returned for reprocessing into a mill sheet. The selected chips can be distributed onto a carrier or felt, heated to a temperature that can provide the necessary degree of plastic flow and deformation as the layer of chips is passed between the rolls of a consolidating device like a calender to allow for the chips to fuse into a continuous sheet. Subsequently, a pass through another calender can be used to provide the desired final gauge and surface smoothness. A release coated finishing sheet can be usefully employed at this step to ensure release from the calender rolls and allow for cooling of the sheet before all pressure is removed by its being stripped from the finished sheet. After the sheet has been cooled to near ambient temperatures it can be rolled up or cut into tiles as desired. The utilization of these compositions in chip form is not restricted to the process described above. A variety of thermoplastic lay-up, heating, and consolidating process sequences are suitable. Some of these could include stencil lay-ups, four roll calenders, and flat bed presses.

A first embodiment of this invention consists of the following formula:

| Ingredients | Parts by Weight |
| --- | --- |
| Silane-grafted EVA[1] | 18 |
| Elvax 265[2] | 22 |
| Iceberg Clay[3] | 26 |
| Veramite[4] | 14 |

| Ingredients | Parts by Weight |
|---|---|
| Alumina Trihydrate[5] | 20 |

[1] Polymer 17407 from AEI Compounds
[2] 27.2% to 28.8% vinyl acetate from DuPont
[3] Anhydrous clay, 1.4 micron overage particle size, pH 5–6, from Burgess Pigment Company
[4] Calcium carbonate, 11 micron average particle size
[5] 325 mesh grade Thirty-five (35) pounds of the above formula were weighed in the specified proportions of each ingredient and charged to a pilot plant scale Banbury mixer. The mixer was run until the mix temperature reached 200° F. At that point, the ram was raised and all ingredients not staying in or reaching the mixing chamber were brushed down. The ram was lowered and mixing continued until 340° F. mix temperature was reached. At that point, which was not longer than 10 minutes after start of mixing, the compounded material was discharged into a pan and transferred to a two-roll mill heated to 240° F. on the faster front roll and 280° F. on the slower back roll. A nominally 40 mil sheet was produced and rolled up for use in a chip making operation.

The mill sheets were then unrolled and fed through a slitter that cut the sheet in two so that it could be fed into a chopper to provide rectangular strips suitable for feeding the throat of a Fitz mill. These strips were cooled below their Tg (glass transition) temperature and fed with dry ice through a Fitz mill equipped with a 3A screen and running at high speed. The resulting product was screened using a #5 screen to remove the large chips and a #24 screen to remove the dust and fines. The yield was above 85%. These chips were delivered to a processing line equipped with a vibratory chip lay-up and distribution device. Approximately 196 grams/ft$^2$ was deposited on a silicon belt traveling at about 20 feet/minute. The chips and belt then traveled through a heating zone that supplied enough heat for the top surface to reach a temperature in excess of 400° F. The chip layer was given an initial consolidation by a cooled (first pass) calender roll set at a gauge of 0.085. Exit gauge exceeded this gauge by approximately 10 mils. Another heating zone was traversed to prepare the chips for the second pass calendering/finishing operation. A finishing release paper of sufficient stiffness so as to not cause wrinkles upon exiting the second pass calender was fed between the sheet and the top roll. The sheet was cooled to less than 200° F. before the release paper was stripped. A uniformly gauged, smooth surfaced product was the result. A comprehensive physical property evaluation and comparison with two existing vinyl products can be found in the table below.

| | VINYL #1 | VINYL #2 | EMBODIMENT #1 |
|---|---|---|---|
| ABRASION PERFORMANCE | | | |
| Frick Taber, Mg./1000 Revs. | 54 | 85 | 31 |
| Modified Sandpaper, 183 Revs. | | | |
| Wt. Loss, GMS | 2.8 | 3.8 | 2.3 |
| Gauge Loss, Mils | 15 | 19 | 13 |
| Modified Sandpaper, 400 Revs. | | | |
| Wt. Loss, GMS | 6.3 | 8.7 | 4.8 |
| Gauge Loss, Mils | 33 | 43 | 27 |
| Frick H-18 - Wt. Loss, Mgs. | 170 | 338 | 174 |
| Frick H-22 - Wt. Loss, Mgs. | 259 | 441 | 369 |
| STAIN RESISTANCE | | | |
| Household, E | 208 | 204 | 135 |
| Hospital | 29 | 34 | 27 |
| Neozone 'A', E | 25 | 39 | 15 |
| FLEXIBILITY | | | |
| Olsen Stiffness (73° F.), Lbs. | 2.4 | 2.3 | 1.6 |
| Olsen Stiffness (55° F.), Lbs. | 4.1 | 3.4 | 2.2 |
| Mandrel Bend 73.4° F. (FO) Radius in Inches | 1/16 | 6/16 | 1/16 |
| Mandrel Bend 55° F. (FO) Radius in Inches | 1/16 | 12/16 | 1/16 |
| FIRE PERFORMANCE | | | |
| NBS Flame | 336 | 249 | 145 |
| Smoke | 372 | 337 | 315 |
| Average | 354 | 293 | 230 |
| Indent (Ball), Residual, Inches | .002 | .003 | .002 |
| Indent (75#) Residual, Inches | .001 | .004 | .001 |
| Indent (120#) Residual, Inches | .001 | .002 | .000 |
| Indent (150#) Residual, Inches | .005 | .017 | .010 |
| Indent (73.4° F.), Mils | 21.2 | 25.6 | 22.5 |
| Indent (115° F.), Mils | 34 | 28 | 31 |
| Indent - Residual, % | 11.1 | 16.1 | 20.1 |
| Static Load (75#) Residual, Inches | .000 | .002 | .000 |
| Modified Static Load (150#) | | | |
| Initial, Inches | .007 | .013 | .006 |
| Residual, Inches | .000 | .004 | .000 |
| DURABILITY | | | |
| Refrigerator Drag, Lbs. | 156 | 156 | 136 |
| Key Drag, Lbs. | 33 | 33 | 33 |
| Can Drop (73° F.), 3P, Inches | 35 | 7 | 30 |
| Can Drop (55° F.), 3P, Inches | 30 | 10 | 25 |
| Pendulum Gouge | | | |
| 90 Ft., Inch - Lbs. | 146 | 105 | 101 |
| Round Ft., - Inch - Lbs. | 150 | 146 | 146 |
| Tensile, PSI | 1970 | 1207 | 1565 |
| Elongation, % | 72.5 | 2.0 | 60 |
| Initial Brown Tear, Lbs. | 35.4 | 5.7 | 39.4 |
| Hardness (Shore D) | 58 | 63 | 51 |
| MISCELLANEOUS PROPERTIES | | | |
| Coefficient of Friction James Machine | .53 | .70 | .73 |
| Dimensional Stability | | | |
| 1 Hour 180/° F., % MD | −1.16 | −0.43 | −1.06 |
| AMD | −0.72 | −0.32 | −0.31 |
| Dimensional Stability | | | |
| 20 Hrs./158° F., % MD | −1.06 | −0.43 | −0.32 |
| AMD | −0.60 | −0.43 | −0.19 |
| Moisture | | | |
| Growth, % | .044 | .082 | .075 |
| Absorption, % | .597 | 9.68 | .37 |

The use of blends of cross-linked silane-grafted ethylene-vinyl acetate (EVA) and filler has found acceptance in the wire and cable industry as a composition which evolve low smoke and no corrosive gas during combustion. It has been found that the addition of conventional ethylene-vinyl acetate to silane-grafted ethylene-vinyl acetate can surprisingly substantially maintain the physical property and fire performance advantages that result from a fully cross-linked composition while at the same time possessing the advantage of reprocessibility.

The ethylene copolymers suitable for the composition of the present invention are copolymers of ethylene with at least one non-ethylene monomer selected from the group consisting of vinyl esters of saturated carboxylic acids wherein the acid moiety has up to 4 carbon atoms, unsaturated mono- or dicarboxylic acids of 3 to 5 carbon atoms and salts of the unsaturated acids wherein the alcohol moiety has 1 to 8 carbon atoms. Terpolymers of ethylene and the above non-ethylene monomers are also suitable. In addition, terpolymers of ethylene/vinyl acetate/carbon monoxide or ethylene/vinyl acetate/sulfur dioxide containing up to about 15 percent by weight of carbon monoxide or sulfur dioxide can also be employed.

Employing a copolymer containing over 28% non-ethylenic monomer (such as vinyl acetate) results in compositions that are more flexible but have less indentation resistance. The most preferred level is about 18 to about 28 weight percent. Below 18% vinyl acetate, the compositions become too rigid.

Melt index of the copolymer can range from about 0.1 to about 400, preferably from about 0.1 to about 50. Physical properties, principally indentation resistance, decline to lower levels when the ethylene copolymer melt index is above about 50. Lower melt index ranges, from about 1 to about 10, are preferred to maintain tensile strength.

Generally from about 5% to about 50% by weight of ethylene copolymer is employed in the composition of the present invention, preferably from about 10% to about 30% by weight, and most preferably from about 15% to about 25% by weight.

Similar properties can be achieved when blends of properly selected ethylene copolymers are used in the composition of the present invention. By combining at least two different properly selected copolymer grades processing or other advantages may occur without the composition properties being significantly changed. Choice of a higher modulus copolymer or copolymers must be accompanied by choice of a lower modulus copolymer or copolymers such that the resulting blend has the needed flexibility.

In accordance with the above, suitable ethylene copolymers are such as ethylene/vinyl acetate, ethylene/acrylic acid and its ionomers, ethylene/methacrylic acid and its ionomers, ethylene/methyl acrylate, ethylene/ethyl acrylate, ethylene isobutyl acrylate, ethylene/normal butyl acrylate, ethylene/isobutyl acrylate/methacrylic acid and its inomers, ethylene/normal butyl acrylate/methacrylic acid and its inomers, ethylene/isobutyl acrylate/acrylic acid and its ionomers, ethylene/normal butyl acrylate/acrylic acid and its inomers, ethylene/methyl methacrylate, ethylene/vinyl acetate/methacrylic acid and its ionomers, ethylene/vinyl acetate/acrylic acid and its ionomers, ethylene/vinyl acetate/carbon monoxide, ethylene/methyl acrylate/carbon monoxide, ethylene/normal butyl acrylate/carbon monoxide, ethylene/isobutyl acrylate/carbon monoxide, ethylene/vinyl acetate/monoethyl maleate and ethylene/methyl acrylate/monoethyl maleate. Particularly suitable copolymers are ethylene/vinyl acetate, ethylene/ethyl acrylate, ethylene/vinyl acetate/methacrylic acid, and ethylene/vinyl acetate/carbon monoxide.

The second essential ingredient of the composition of the present invention is a silane-grafted version of the above ethylene copolymers. Of particular suitability are the silane-grafted ethylene/vinyl acetates. The silane grafting can range from about one graft per 100 carbon atoms to about one graft per 5000 carbon atoms, preferably from about one graft per 500 carbon atoms to about one graft per about 2000 carbon atoms. Most preferably the grafting density is about one graft per 1000 carbon atoms. If the grafting density is high then more conventional ethylene/vinyl acetate can be utilized and still preserve the benefits of partial cross-linking. If the grafting density is too high there can be shelf life difficulties and too much dilution of the silane grafted ethylene/vinyl acetate is required to preserve reprocessability.

A third essential ingredient for the subject blend is the filler. The percentage of filler that can be included in the composition of the present invention is primarily a function of the density and particle size of the filler. Shape of the filler also will have an effect on the properties of the blend. A significant portion of the filler is preferred to be of fine particle size in order to obtain the desired reinforcement. A filler of 325 mesh or finer is considered a fine particle size. The amount of filler present in the composition of the present invention is from about 30% to about 90% by weight, preferably from about 50% to about 85% by weight. Most preferably, when sufficient amount of fine fillers are used to obtain the necessary reinforcement, the amount of filler is from about 55% to about 75% by weight.

Preferred fillers are calcium carbonate, clay and alumina trihydrate. The most preferred fillers are the anhydrous or calcined clays. Characteristic of these fillers is a fine particle size and a plate like structure. The clays are the most efficient in developing reinforcement that produces indentation resistance and at the same time preserves a reasonable amount of flexibility. Alumina trihydrate is next in reinforcing efficiency, but its higher cost makes it less attractive. A blended filler is preferred that consists of clay from about 20% to about 80% by weight percent of the filler portion of the composition of the present invention, preferably from about 30 to 70% by weight. Most preferably the clay content of the filler blend is from about 40% to about 60% by weight. A preferred combination of fillers is one that combines a clay with a calcium carbonate. Such a filler blend, when the ratio of clay to calcium carbonate is about 1, produces compositions whose elongations are higher than with either filler alone without a significant sacrifice of other properties. Alumina trihydrate or fumed silica can be used to modify processing characteristics and to provide additional fire resistance.

Fillers coarser than 325 mesh may be used to enhance processing characteristics. Most preferred are fillers that are no coarser than 50 mesh. Small amounts of larger than 50 mesh fillers can also be incorporated with minimal effect on properties.

In addition to the fillers mentioned above, incorporation of many other types of fillers is, of course, possible without altering the fundamentals taught in this patent. There may be a variety of reasons such as lowering or raising density or altering tensile strength/elongation relationships to include one or more of the following fillers: powdered iron or lead, or oxides of them, magnesium carbonate, calcium sulfate, silica, flyash, cement dust, talc, mica, wollastonite, glass beads, synthetic ceramic hollow spheres, inorganic and organic fibers, yarns, wood flour, nut shells, rice balls, etc.

Suitable catalysts, among which are the Lewis acid types, are of interest for the compositions of the present invention in order to more rapidly and completely accomplish the degree of cross-linking that is possible. The most preferred catalyst is dibutyl tin dilaurate. The amount to be employed is from 0% to about 5% by weight, preferably from 0% to about 2% by weight, and most preferably from 0% to about 1% by weight. Compositions whose filler system is somewhat inadequate in providing the required indentation resistance can be improved by the additional cross-linking that can be achieved with the use of a catalyst. In addition, in those instances where there is a concern about the consistency of the finished products' properties, use of a catalyst would be helpful. However, in all other cases, ease of processing would dictate the use of no catalyst.

Polymers, both homo- and copolymers, other than the ones referred to above, can also be used to some extent in combination with the above specified polymers without significantly interfering with the advantages obtained by the present invention. Similarly, other ingredients can also be added to the compositions of the present invention by a compounder in order to obtain some desired effect, such as reduction of cost, or enhancement of a physical property. Accordingly, extender resins, foaming agents, peroxide cross-linking agents, antioxidants, pigments, tackifiers, etc., that are widely used in the compounding of polymeric materials can be considered for use in the present invention. Illustrative examples of several special additives and of potentially desirable resin ingredients are given below.

The first group of plasticizers of the composition of the present invention is known as process or processing oil. Three types of processing oils are known—paraffinic, aromatic, and naphthenic. None of these are pure; the grades identify the major oil type present.

Paraffinic oils tend to "bleed" from blends. Bleeding is not desirable. On the other hand, naphthenic and aromatic oils are nonbleeding when used in proper ratios and are thus preferred for uses such as floor coverings.

Processing oils are also subdivided by viscosity range. "Thin" oils can be as low as 100-500 SUS (Saybolt Universal Seconds) at 100 degrees F. "Heavy" oils can be as high as 6000 SUS at 100 degrees F. Processing oils, especially naphthenic and aromatic oils with viscosity of from about 100 to 6000 SUS at 100° F. are preferred.

The amount of plasticizer, such as the process oil, can be from 0 to about 20% by weight, preferably from 0% to about 10% by weight, and most preferably 0% to about 5% by weight. The amount of plasticizer used must be limited by the need to provide a minimum indentation resistance. Small amounts can be incorporated to modify processing characteristics associated with melt rheology.

The second group of plasticizers that could be used in the practice of the present invention is the group comprising epoxidized oils such as epoxidized soybean oil and epoxidized linseed oil.

The third group of plasticizers that could be used are the polyesters which, in general, are liquid condensation products of a polybasic acid and a polyol.

Elastomeric polymers are of interest as modifying resins for the blends of the present invention. They exhibit good compatibility in the blends of the present invention and can be useful for modifying flexibility or other physical properties. The blends of the present invention can contain from 0 to about 50% by weight of an elastomer or a mixture of elastomers, preferably from 0% to about 20% by weight, and most preferably from 0% to about 8% by weight. Thermoplastic elastomers (e.g., ethylene-propylene rubber, styrene-butadiene-styrene, polyurethane, etc.) or vulcanizable elastomers (e.g., styrene-butadiene rubber, ethylene/propylene/diene terpolymer (EPDM), etc.) can be used. Preferred elastomers are the thermoplastic elastomers. These can be used without affecting the reprocessibility of the compositions of this invention.

Surface active agents can be used in these compositions for which the filler loading level has decreased flexibility to an undesirable level. A suitable surface active agent can be selected from the group consisting of alkanol amides; betaine derivatives; block copolymers comprising a series of condensates of ethylene oxide with hydrophobic bases formed by condensing propylene oxide with propylene glycol; ethoxylated compounds comprising alcohols, alkyl phenols, amines and amides; sulfonated derivatives comprising alkyl sulfonates, aryl sulfonates, alkyl-aryl sulfonates, amine and amide sulfonates, olefin sulfonates, sulfosuccinates, sulfonated fatty acid esters, sulfonates of ethoxylated alkyl phenols and of oils and of fatty acids, naphtholene and alkyl naptholene sulfonates, condensed naphtholene sulfonates, napthalene and alkyl napthalene sulfonates and petroleum sulfonates, and dodecyl and tridecyl benzene sulfonates; dodecyl and tridecyl sulfonic acids; sulfates of alcohols, of ethoxylated alcohols, or ethoxylated alkyl phenols, of oils, of fatty acids, of fatty esters, alkaryl sulfates, and sodium, ammonium and amine salts thereof; phosphate derivatives comprising phosphate esters, phosphate alcohol ethoxylates, phosphate ether ethoxylates, phosphate alkyl acids and phosphate alkyl quaternaries; and quaternary surfactants. Use of a surface active agent is in the amount of 0% to about 5% by weight, preferably from 0% to about 2.5% by weight, and most preferably from 0% to about 0.75% by weight.

The blends described above provide all the essential property requirements for a properly performing floor product. However, there is another class of materials generally defined as a "wax" that can be of use in modifying the surface properties and/or processing characteristics of the compositions of this invention. Waxes which are effective in accomplishing these purposes are those selected from the group consisting of natural waxes comprising waxes from insects (beeswax, scale insect waxes), waxes from animals (woolwax, spermaceti, liquid waxes-marine oils), waxes from plants (formation in arid plants, palm tree waxes, candelilla wax, retamo wax, flax wax, cotton wax, hemp wax, sugarcane wax, esparto wax, sorghum-grain wax, ricebran wax, leaf blade waxes, waxes from roots, waxes from barks, japanwax, myrica waxes, cranberry wax, cuticle waxes of fruit, liquid vegetable wax, floral waxes), waxes from microorganisms, waxes in cerebrosides; petroleum waxes comprising wax distillates, crystalline types of petroleum waxes, wax hydrocarbons, rod wax, paraffine waxes (slack wax, fully refined paraffines), petrolatum, microcrystalline waxes, effect of petroleum waxes on metals, antioxidants for waxes; synthetic waxes comprising classification, polyethylene wax, ethylene copolymer waxes, carbowaxes, halogented hydrocarbon waxes (chlorinated paraffin wax, chlorinated naphthalenes), gersthofen waxes, polyhydric alcohol esters of hydroxy acids, fischer-tropsch waxes, hydrogenated waxes, waxy ketones, fatty acid amides, imide waxes, polyol ether esters, miscellaneous unclassified waxes; commercial modified, blended, and compounded waxes comprising oxidized hydrocarbon waxes, vacuum-distilled waxes, modified ester type waxes, emulsifiable polyethylene waxes, ceresin wax, paraffin and carbauba wax blends, dairy wax, polyethylene and petroleum wax mixtures, silicone and wax compositions, cellulose ether wax, substitute waxes; emulsifiable waxes, waxy alcohols and acids, metallic soaps comprising waxes with free alcohols, emulsifiable wax stocks, scale wax emulsions, DMC waxes, emulsifying agents, synthetic emulsifiable waxes, polyhydric alcohol fatty acid esters, surface-active agents, naphthenic acids, wax emulsions for specific uses, waxy alcohols, waxy acids, acids from paraffin wax, eutectics of fatty acids, hydroxystearic acid, metallic soaps; fossil waxes, earth waxes, peat waxes, montan waxes, and lignite paraffins comprising waxes form low forms of marine life, ozocerite, utah wax, ceresin, peat wax, montan wax, alpco wax, paraffin wax from shale oils, paraffin wax from brown coal.

The preferred waxes are those of either a white or slightly yellow color. The most preferred waxes are those classified as microcrystalline. Microcrystalline waxes have a number of particularly useful properties. Some of these are a higher molecular weight than paraffin waxes, toughness exhibited by a resistance to fracture, compatibility with oil, and a lower extent of contraction when passing from the liquid to a solid state. Waxes are used in the amount of 0% to about 10%, preferably 0% to about 6%, and most preferably 0% to about 2%.

The teachings above have dealt with several different potential ingredients on an "individual ingredient" basis to describe possible contributions possible from widely varying filler or polymer types. It must be stressed that the ingredients of the above types can, of course, be mixed so that, for example, the compounder may elect to modify a simple three component composition, EVA/silane-grafted EVA/filler, by replacing part of the EVA with a small amount of another polymer such as a rubber to change the modulus of the composition. In addition the filler could be a blend of several fillers to achieve a cost efficient development of properties. If waxes are used, more than one wax could be used to achieve varying rates of migration to the surface. Thus, the possible combinations and permutations available to a skilled compounder will be infinite, yet remain within the spirit of this invention.

Although there is a degree of cross-linking involved with the compositions of the present invention, there remains enough thermoplasticity to permit recycling after processing. A commercially available low-intensity mixer like the F-type Baker Perkins is entirely suitable for preparing the compositions of the present invention. A commercially available batch-type Banbury or a Farrel continuous (FCM) intensive mixing device is also an excellent mixing device. Extruders, particularly twin-screw compounding extruders, can also be effectively used to mix the compositions of the present invention.

In any instance, dry ingredients are charged in routine fashion. When small amounts of a liquid ingredient is used, they may be directly injected into the mixing chamber as is usual practice. It is most convenient to master batch the catalyst in a conventional thermoplastic polymer in order to achieve the desired uniform distribution. Otherwise, non-uniform properties may be developed. Similarly small amounts of a solid ingredient may be used as a masterbatch incorporating a low level of the fillers. It is important to obtain a mixture that is thoroughly fluxed to attain homogeneity. When using an intensive mixer like a Banbury, longer mix times and cleaner discharge can be obtained by using cooling water in both the jacket and the rotors. A mix time of at least four minutes produces the best results and five minutes or longer is preferred. Drop temperatures typically can vary from as low as 280° F. to as high as 380° F. Too high a drop temperature can produce a melt rheology that promotes the generation of air entrapped defects in a subsequent sheeting operation. A FCM will generally produce higher output temperatures than the Banbury.

Generally, changes in the sequence of addition of ingredients has not been found to be significant. Of greatest importance is that the ingredients be thoroughly fluxed in order to attain homogeneity.

Once blends are mixed, routine commercial practices may be used, such as sheeting, calendering, pelletizing, molding, etc. to convert the mix into a structure appropriate for use as floor product.

The principal advantage of this invention is that a reprocessable non-halogen containing floor product is possible with the essential properties of a fully cross-linked composition. The acidic products of combustion possible with the presence of a halogen are eliminated. Furthermore, much lower smoke is evolved than with fully cross-linked products. At the same time there is an excellent balance between the indentation resistance and the flexibility that is normally achieved with completely cross-linked compositions.

The examples which follow are given for the purpose of illustrating the present invention. All parts and percentages are by weight unless otherwise specified. Most of the compositions were compounded on an eight inch diameter two-roll mill using full steam pressure on both rolls. Then, the compounded ingredients were reduced to uniform gauge between two release surfaces in a flat bed press heated to about 300° F.

EXAMPLES 1 TO 12

The composition and physical properties of Examples 1 to 12 are set forth in Tables 1 to 4. The Comparative Examples C-1 to C-3 containing single conventional EVA as a replacement for the silane-grafted EVA of Comparative Example C-0 in Table 1 and Comparative Examples C-4 to C-6 containing single conventional EVA as a replacement for the silane-grafted EVA of Comparative Example C-00 in Table 2. Generally, the Comparative Examples C-0 and C-00 exhibit superior indentation resistance when compared to the ungrafted EVA comparative examples.

The examples of the present invention demonstrate the results of blending the conventional EVAs with the silane-grafted EVA. What is remarkable and quite unexpected is that utilization of a conventional EVA produces compositions that preserve the ability of the silane-grafted EVA to provide superior indentation resistance while generally at least maintaining the tensile strength and elongation of the fully silane-grafted EVA. The result is a more cost effective means of achieving a desirable balance between indentation resistance, elongation and tensile strength while maintaining the ability to reprocess scrap material.

TABLE 1

Effective combining of a convenional EVA with a silane-grafted EVA at 60% filler loading.

| | Example No. | | | | | | |
|---|---|---|---|---|---|---|---|
| | C-0 | 1 | C-1 | 2 | C-2 | 3 | C-3 |
| Silane-grafted EVA | 40 | 20 | | 20 | | 20 | |
| Elvax 450[6] | | 20 | 40 | | | | |
| Elvax 265 | | | | 20 | 40 | | |
| Elvax 4260[7] | | | | | | 20 | 40 |
| Iceberg Clay | 26 | 26 | 26 | 26 | 26 | 26 | 26 |

TABLE 1-continued

Effective combining of a convenional EVA with a silane-grafted EVA at 60% filler loading.

| | Example No. | | | | | | |
|---|---|---|---|---|---|---|---|
| | C-0 | 1 | C-1 | 2 | C-2 | 3 | C-3 |
| Veramite | 14 | 14 | 14 | 14 | 14 | 14 | 14 |
| Alumina Trihydrate | 20 | 20 | 20 | 20 | 20 | 20 | 20 |
| Tensile Strength[8], psi | 1660 | 1772 | 1388 | 1754 | 1286 | 1517 | 1290 |
| Elongation[8], % | 49 | 40 | 15 | 82 | 85 | 65 | 104 |
| Cross-product of Tensile Strength & Elongation | 813 | 709 | 208 | 1438 | 1093 | 986 | 1342 |
| Initial Indentation[9], mils | 9 | 7 | 6 | 9 | 12 | 12 | 18 |
| Residual Indentation[10], % | 13 | 14 | 24 | 16 | 22 | 13 | 17 |
| Sum of Initial Indentation & Residual Indentation | 22 | 21 | 30 | 25 | 34 | 25 | 35 |

[6]17.0% to 19.0% vinyl acetate from DuPont
[7]Ethylene/vinyl acetate/methacrylic acid terpolymer from DuPont
[8]Tensile Strength and Elongation -- Crosshead speed: 20 in./min., Jaw separation: 2.0 in., Specimen size: 0.25 in. × 3.75 in. dumbbell.
[9]Initial Indentation, mils -- Load: 120 lbs., Flat tip: 0.282 in. diameter, Time: ten minutes.
[10]Residual Indentation, % -- Load: 140 lbs., Flat circular tip: .178 in. diameter, Time: ten minutes initial, 60 minutes recovery time with no load, Measurement of residual indentation: 8 oz. load on a .125 in. flat diameter tip.

In Table 1, the sum of initial indentation and residual indentation and the tensile strength of the compositions of the present invention are superior to the corresponding comparative examples. Further, the tensile strength, elongation, initial indentation and residual indentation of the fully silane-grafted EVA is maintained in each of the compositions of the present invention.

TABLE 2

Effective combining a conventional EVA with a silane-grafted EVA at 67% filler loading.

| | Example No. | | | | | | |
|---|---|---|---|---|---|---|---|
| | C-00 | 4 | C-4 | 5 | C-5 | 6 | C-6 |
| Silane-grafted EVA | 33 | 16.5 | | 16.5 | | 16.5 | |
| Elvax 450 | | 16.5 | 33 | | | | |
| Elvax 265 | | | | 16.5 | 33 | | |
| Elvax 4260 | | | | | | 16.5 | 33 |
| Iceberg Clay | 29.0 | 29.0 | 29.0 | 29.0 | 29.0 | 29.0 | 29.0 |
| Veramite | 15.6 | 15.6 | 15.6 | 15.6 | 15.6 | 15.6 | 15.6 |
| Alumina Trihydrate | 22.4 | 22.4 | 22.4 | 22.4 | 22.4 | 22.4 | 22.4 |
| Tensile Strength, psi | 1798 | 1804 | 1696 | 1993 | 1369 | 1807 | 1542 |
| Elongation, % | 22 | 23 | 14 | 26 | 43 | 32 | 57 |
| Cross-product of Tensile Strength & Elongation | 396 | 415 | 273 | 518 | 589 | 578 | 879 |
| Initial Indentation, mils | 8 | 6 | 5 | 7 | 8 | 7 | 10 |
| Residual Indentation, % | 5 | 6 | 10 | 6 | 17 | 6 | 14 |
| Sum of Initial Indentation & Residual Indentation | 13 | 12 | 15 | 13 | 25 | 13 | 24 |

The results in Table 2 are similar to Table 1.

TABLE 3

Effective combining a second conventional EVA at 60% filler loading.

| | Example No. | | | | | |
|---|---|---|---|---|---|---|
| | 7 | C-7 | 8 | C-8 | 9 | C-9 |
| Silane-grafted EVA | 17 | | 17 | | 17 | |
| Elvax 450 | 17 | 34 | | | | |
| Elvax 265 | | | 17 | 34 | | |
| Elvax 4260 | | | | | 17 | 34 |
| Elvax 150[11] | 6 | 6 | 6 | 6 | 6 | 6 |
| Iceberg Clay | 26 | 26 | 26 | 26 | 26 | 26 |
| Veramite | 14 | 14 | 14 | 14 | 14 | 14 |

TABLE 3-continued

Effective combining a second conventional EVA at 60% filler loading.

| | Example No. | | | | | |
|---|---|---|---|---|---|---|
| | 7 | C-7 | 8 | C-8 | 9 | C-9 |
| Alumina Trihydrate | 20 | 20 | 20 | 20 | 20 | 20 |
| Tensile Strength, psi | 1518 | 1271 | 1639 | 1065 | 1767 | 1488 |
| Elongation, % | 58 | 24 | 70 | 74 | 63 | 100 |
| Cross-product of Tensile Strength & Elongation | 880 | 305 | 1147 | 788 | 1113 | 1488 |
| Initial Indentation, mils | 9 | 7 | 12 | 13 | 11 | 11 |
| Residual Indentation, % | 22 | 27 | 19 | 26 | 18 | 23 |
| Sum of Initial Indentation & Residual Indentation | 31 | 34 | 31 | 39 | 29 | 34 |

[11]32.0% to 34.0% vinyl acetate from DuPont

TABLE 4

Effect of combining a second conventional EVA at 67% filler loading.

| | Example No. | | | | | |
|---|---|---|---|---|---|---|
| | 10 | C-10 | 11 | C-11 | 12 | C-12 |
| Silane-grafted EVA | 14 | | 14 | | 14 | |
| Elvax 450 | 14 | 28 | | | | |
| Elvax 265 | | | 14 | 28 | | |
| Elvax 4260 | | | | | 14 | 28 |
| Elvax 150 | 5 | 5 | 5 | 5 | 5 | 5 |
| Iceberg Clay | 29.0 | 29.0 | 29.0 | 29.0 | 29.0 | 29.0 |
| Veramite | 15.6 | 15.6 | 15.6 | 15.6 | 15.6 | 15.6 |
| Alumina Trihydrate | 22.4 | 22.4 | 22.4 | 22.4 | 22.4 | 22.4 |
| Tensile Strength, psi | 1812 | 1419 | 1771 | 1268 | 1730 | 1417 |
| Elongation, % | 28 | 13 | 30 | 34 | 35 | 47 |
| Cross-product Tensile Strength & Elongation | 507 | 184 | 531 | 431 | 606 | 666 |
| Initial Indentation, mils | 6 | 6 | 8 | 10 | 8 | 17 |
| Residual Indentation, % | 7.2 | 19.8 | 8.0 | 24.8 | 12.1 | 17.1 |
| Sum of Initial Indentation & Residual Indentation | 13.2 | 25.8 | 16.0 | 35.8 | 20.1 | 34.1 |

EXAMPLES 13 TO 20

The most preferred compositions of this invention do not contain a catalyst and/or use a curing schedule. However, a catalyst and/or a curing schedule can be used to increase the cross-linking of the silane-grafted EVA. There are two situations that would particularly recommend the use of a catalyst and/or curing schedule, when a composition has insufficient indentation resistance or there is a concern about the instability of a composition's properties over time as the partial cross-linking is carried to its fullest extent. Compositions in Table 5 illustrate the general consequences of the use of a catalyst and/or a cure schedule. Examples 13, 14, 17, and 18 were prepared using no cure schedule. Examples 15, 16, 19, and 20 were placed in a 158° F. oven for three days before testing. It can be seen that only the addition of a catalyst has relatively little effect on physical properties. However, with the use of a curing schedule there can be significant improvement in the indentation resistance as shown by comparing Examples 13 and 14 with Examples 15 and 16. The best properties for a given composition are typically obtained with the use of both a catalyst and cure schedule. However, Examples 19 and 20 illustrate that with some compositions, particularly those that have initially superior residual indentation resistance, there is little change in properties with the use of a cure schedule.

TABLE 5

Effect of the use of a catalyst and a curing schedule.

| | Example No. | | | | | | | |
|---|---|---|---|---|---|---|---|---|
| | 13 | 14 | 15 | 16 | 17 | 18 | 19 | 20 |
| Silane-grafted EVA | 15 | 15 | 15 | 15 | 15 | 15 | 15 | 15 |
| Elvax 265 | 18 | 18 | 18 | 18 | 18 | 18 | 18 | 18 |
| 325 m Limestone | 67 | 67 | 67 | 67 | 33.5 | 33.5 | 33.5 | 33.5 |
| Iceberg Clay | | | | | 33.5 | 33.5 | 33.5 | 33.5 |
| Cure Schedule | No | No | Yes | Yes | No | No | Yes | Yes |
| Catalyst[12] | | 1 | | 1 | | 1 | | 1 |
| Tensile Strength, psi | 1012 | 1116 | 1094 | 1091 | 1290 | 1244 | 1498 | 1237 |
| Elongation, % | 15 | 20 | 21 | 37 | 42 | 30 | 43 | 31 |
| Cross-product Tensile Strength & Elongation | 152 | 223 | 230 | 404 | 541 | 373 | 644 | 383 |
| Initial Indentation, mils | 12 | 10 | 13 | 11 | 8 | 7 | 7 | 9 |
| Residual Indentation, % | 26.1 | 26.7 | 19.4 | 13.3 | 12.2 | 14.0 | 11.1 | 12.1 |
| Sum of Initial Indentation & Residual Indentation | 38.1 | 36.7 | 32.4 | 34.4 | 20.2 | 21.0 | 18.1 | 21.1 |

[12]Catalyst 17424 from AEI Compounds

EXAMPLES 21 TO 24

These examples illustrate the use of processing oil.

TABLE 6

Effect of the use of processing oil.

| | Example No. | | | |
|---|---|---|---|---|
| | 21 | 22 | 23 | 24 |
| Silane-grafted EVA | 15 | 15 | 15 | 15 |
| Elvax 265 | 18 | 18 | 18 | 18 |
| Veramite | 27 | 27 | 27 | 27 |
| Iceberg Clay | 40 | 40 | 40 | 40 |
| Circosol 4240[13] | 0 | 1 | 3 | 6 |
| Tensile Strength, psi. | 1649 | 1498 | 1298 | 1068 |
| Elongation, % | 40 | 55 | 60 | 78 |
| Cross-product Tensile Strength & Elongation | 660 | 824 | 779 | 833 |
| Initial Indentation, mils | 6 | 10 | 10 | 25 |
| Residual Indentation, % | 10.1 | 14.4 | 20.5 | 31.3 |
| Sum of Initial Indentation & Residual Indentation | 16.1 | 24.4 | 30.5 | 56.3 |

[13]Naphthenic processing oil from Sun Oil Company

EXAMPLES 25 TO 33

The soiling characteristics of flooring products can depend on the characteristics of the surface. A good mechanism for modifying surfaces to improve soiling characteristics is to employ an ingredient within that product that provides for soil release and overall maintenance of wear appearance. An important category of such ingredients are the waxes. Proper selection can provide a was that migrates to the surface to enrich the surface with wax and to constantly replenish it as the surface is worn. With a migrating wax lower levels can be used while still providing substantial modification of the surfaces. The examples in Tables 7 and 8 illustrate a variety of waxes that can be used with little detrimental effect on properties.

TABLE 7

Use of a variety of waxes.

| | Example No. | | | | | | | | |
|---|---|---|---|---|---|---|---|---|---|
| | 25 | 26 | 27 | 28 | 29 | 30 | 31 | 32 | 33 |
| Silane-grafted EVA | 18 | 18 | 18 | 18 | 18 | 18 | 18 | 18 | 18 |
| Elvax 265 | 22 | 22 | 22 | 22 | 22 | 22 | 22 | 22 | 22 |
| Filler Blend | 60 | 60 | 60 | 60 | 60 | 60 | 60 | 60 | 60 |
| Hoechst Wax E | | .75 | | | | | | | |
| Hoechst Wax OP | | | .75 | | | | | | |
| Hoechst Wax S | | | | .75 | | | | | |
| Hoechst PED-522 | | | | | .75 | | | | |
| Starwax 100[14] | | | | | | .75 | | | |
| Be Square 175[14] | | | | | | | .75 | | |
| Paraffin | | | | | | | | .75 | |
| Zinc Stearate | | | | | | | | | .75 |
| Tensile Strength, psi. | 1736 | 1607 | 1741 | 1744 | 1593 | 1609 | 1589 | 1755 | 1493 |
| Elongation, % | 80 | 84 | 73 | 81 | 78 | 82 | 77 | 78 | 87 |
| Cross-product of Tensile Strength & Elongation | 1389 | 1350 | 1271 | 1413 | 1243 | 1319 | 1224 | 1369 | 1299 |
| Initial Indentation, mils | 12 | 9 | 14 | 16 | 10 | 13 | 16 | 9 | 11 |
| Residual Indentation, % | 16.4 | 15.8 | 16.0 | 16.1 | 16.3 | 15.6 | 19.5 | 18.8 | 17.4 |
| Sum of Initial Indentation & Residual Indentation | 28.4 | 24.8 | 30.0 | 32.1 | 26.3 | 28.6 | 35.5 | 27.8 | 28.4 |

[14]From Petrolite Specialty Polymers Group

The data contained in Table 6 shows that there is an ever decreasing indentation performance with increasing levels of process oil. The maximum level that would be acceptable depends on the specifications for a particular product and market. Also, elongations increase and tensile strengths decrease. In addition to changes in the physical properties, there is a change in the process rheology as the processing oil lowers melt viscosity.

TABLE 8

Effect of varying levels of several waxes.

| | Example No. | | | | | |
|---|---|---|---|---|---|---|
| | 34 | 34 | 34 | 34 | 34 | 34 |
| Silane-grafted EVA | 18 | 18 | 18 | 18 | 18 | 18 |
| Elvax 265 | 22 | 22 | 22 | 22 | 22 | 22 |
| Filler Blend | 60 | 60 | 60 | 60 | 60 | 60 |
| Hoechst Wax E | .75 | 1.5 | 3.0 | | | |
| Starwax 100 | | | | .75 | 1.5 | 3.0 |
| Tensile Strength, psi. | 1602 | 1706 | 1701 | 1827 | 1745 | 1529 |
| Elongation, % | 81 | 88 | 81 | 86 | 81 | 90 |
| Cross-product of Ten- | 1298 | 1501 | 1378 | 1571 | 1413 | 1376 |

TABLE 8-continued

Effect of varying levels of several waxes.

| | Example No. | | | | | |
|---|---|---|---|---|---|---|
| | 34 | 34 | 34 | 34 | 34 | 34 |
| sile Strength & Elongation | | | | | | |
| Initial Indentation, mils | 10 | 9 | 8 | 12 | 9 | 10 |
| Residual Indentation, % | 17.6 | 18.7 | 17.8 | 15.8 | 14.8 | 19.5 |
| Sum of Initial Indentation & Residual Indentation | 27.6 | 27.6 | 25.8 | 27.8 | 23.8 | 29.5 |

EXAMPLES 35 TO 42

Surfactants can be used to modify processing characteristics and physical properties. The examples found in Table 9 illustrate the use of varying levels of surfactant in compositions of different filler loadings. The choice of surfactant depends on what particular effect is needed.

TABLE 9

Effect of the use of surfactant.

| | Example No. | | | | | | | |
|---|---|---|---|---|---|---|---|---|
| | 35 | 36 | 37 | 38 | 39 | 40 | 41 | 42 |
| Silane-grafted EVA | 15 | 15 | 15 | 15 | 11 | 11 | 11 | 11 |
| Elvax 265 | 18 | 18 | 18 | 18 | 14 | 14 | 14 | 14 |
| Vermite | 27 | 27 | 27 | 27 | 30 | 30 | 30 | 30 |
| Iceberg Clay | 45 | 45 | 45 | 45 | 45 | 45 | 45 | 45 |
| Duponol Me[15] | | .10 | .25 | 1.0 | | .25 | 1.0 | 1.5 |
| Tensile Strength, psi | 1617 | 1554 | 1723 | 1602 | 1773 | 1666 | 1664 | 1453 |
| Elongation, % | 60 | 50 | 72 | 68 | 12 | 28 | 32 | 38 |
| Cross-product Tensile Strength & Elongation | 970 | 777 | 1241 | 1089 | 213 | 466 | 532 | 552 |
| Initial Indentation, mils | 6 | 8 | 8 | 8 | 6 | 5 | 6 | 10 |
| Residual Indentation, % | 11.1 | 14.3 | 14.4 | 17.9 | 3.3 | 4.3 | 6.0 | 9.6 |
| Sum of Initial Indentation & Residual Indentation | 17.1 | 22.3 | 22.4 | 25.9 | 9.3 | 9.3 | 12.0 | 19.6 |

EXAMPLES 43 TO 62

Examples found in Tables 10 and 11 illustrate the use of additional polymers.

TABLE 10

Use of additional polymers.

| | Example No. | | | | | | | |
|---|---|---|---|---|---|---|---|---|
| | 43 | 44 | 45 | 46 | 47 | 48 | 49 | 50 |
| Silane-grafted EVA | 16.5 | 15 | 13 | 11 | 11 | 11 | 25 | 18 |
| Elvax 450 | | 15 | 13 | 11 | 11 | | | |
| VLDPE[16] | | | | 5 | | 11 | 8 | 15 |
| HDPE[17] | 16.5 | 3 | 7 | 11 | 6 | | | |
| Primacor 5981[18] | | | | | 27 | 27 | 27 | 27 |
| Veramite | | | | | 40 | 40 | 40 | 40 |
| Iceberg Clay | | | | | | | | |
| Alumina Trihydrate | 67 | 67 | 67 | 67 | | | | |
| Tensile | 3146 | 2358 | 2526 | 2677 | 1808 | 1316 | 1903 | 2157 |

TABLE 10-continued

Use of additional polymers.

| | Example No. | | | | | | | |
|---|---|---|---|---|---|---|---|---|
| | 43 | 44 | 45 | 46 | 47 | 48 | 49 | 50 |
| Strength psi | | | | | | | | |
| Elongation, % | 5 | 5 | 20 | 10 | 10 | 25 | 7 | 9 |
| Cross-product Tensile Strength & Elongation | 157 | 118 | 505 | 268 | 181 | 329 | 133 | 194 |
| Initial Indentation, mils | 3 | 4 | 5 | 3 | | | | |
| Residual Indentation, % | 1.0 | 3.0 | 2.0 | 1.6 | 5.4 | 25.0 | 3.1 | 1.9 |
| Sum of Initial Indentation & Residual Indentation | 4.0 | 7.0 | 7.0 | 4.6 | | | | |

[16] 0.88 sp. gr. very low density polyethylene from Union Carbide
[17] High density polyethylene. HDPE 8007 from Union Carbide
[18] Ethylene/acrylic acid from DOW

TABLE 11

Use of thermoplastic elastomers.

| | Example No. | | | | | | | |
|---|---|---|---|---|---|---|---|---|
| | 51 | 52 | 53 | 54 | 55 | 56 | 57 | 58 |
| Silane-grafted EVA | 35 | 20 | 5 | 1 | 1 | 1 | 29 | 17 |
| Elvax 265 | | | | 34 | 19 | 4 | | |
| Kraton 1650[19] | 5 | 20 | 35 | 5 | 20 | 35 | 4 | 16 |
| Pebax 3533[20] | | | | | | | | |
| Veramite | 24 | 24 | 24 | 24 | 24 | 24 | 27 | 27 |
| Iceberg Clay | 36 | 36 | 36 | 36 | 36 | 36 | 40 | 40 |
| Tensile Strength, psi. | 1364 | 1462 | 1587 | 1565 | 1624 | 1739 | 1397 | 1482 |
| Elongation, % | 64 | 92 | 306 | 164 | 181 | 336 | 35 | 60 |
| Cross-product of Tensile Strength & Elongation | 87 | 134 | 486 | 257 | 294 | 584 | 489 | 89 |
| Initial Indentation, mils | 8 | | 34 | 11 | 14 | | 6 | 8 |
| Residual Indentation, % | 16.3 | 7.1 | 3.8 | 15.2 | 7.7 | 3.7 | 7.1 | 4.9 |
| Sum of Initial Indentation & Residual Indentation | 24.3 | | 37.8 | 26.2 | 21.7 | | 13.1 | 12.9 |

| | Example No. | | | | | | | |
|---|---|---|---|---|---|---|---|---|
| | 59* | 60 | 61 | 62* | 63 | 64 | 65 | 66 |
| Silane-grafted EVA | 4 | 1 | 1 | 1 | 35 | 20 | 5 | 1 |
| Elvax 265 | | 28 | 16 | 3 | | | | 34 |
| Kraton 1650 | 29 | 4 | 16 | 29 | | | | |
| Pebax 3533 | | | | | 5 | 20 | 35 | 5 |
| Veramite | 27 | 27 | 27 | 27 | 24 | 24 | 24 | 24 |
| Iceberg Clay | 40 | 40 | 40 | 40 | 36 | 36 | 36 | 36 |
| Tensile Strength, psi, | 1395 | 1535 | | 1214 | 1130 | 1158 | 991 | |
| Elongation, % | | 85 | 108 | | 44 | 44 | 41 | 58 |
| Cross-product of Tensile Strength & Elongation | | 119 | 166 | | 534 | 497 | 475 | 575 |
| Initial Indentation, mils | | 7 | 10 | | 9 | 8 | 11 | 11 |
| Residual Indentation, | | 9.3 | 7.5 | | 19.7 | 22.7 | 21.8 | 23.1 |

TABLE 11-continued

| % | | | | | | | | |
|---|---|---|---|---|---|---|---|---|
| Sum of Initial Indentation & Residual Indentation | 16.3 | 17.5 | | 28.7 | 30.7 | 32.8 | 34.1 | |

| | Example No. | | | | | | | |
|---|---|---|---|---|---|---|---|---|
| | 67 | 68 | 69 | 70 | 71 | 72 | 73 | 74 |
| Silane-grafted EVA | 1 | 1 | 29 | 17 | 4 | 1 | 1 | 1 |
| Elvax 265 | 19 | 4 | | | | 28 | 16 | 3 |
| Kraton 1650 | | | | | | | | |
| Pebax 3533[20] | 20 | 35 | 4 | 16 | 29 | 4 | 16 | 29 |
| Veramite | 24 | 24 | 27 | 27 | 27 | 27 | 27 | 27 |
| Iceberg Clay | 36 | 36 | 40 | 40 | 40 | 40 | 40 | 40 |
| Tensile Strength, psi. | 1002 | 1102 | 1442 | 1409 | 1373 | 1126 | 1294 | 1368 |
| Elongation, % | 168 | 56 | 28 | 34 | 28 | 52 | 38 | 26 |
| Cross-product of Tensile Strength & Elongation | 1683 | 617 | 404 | 479 | 384 | 586 | 491 | 356 |
| Initial Indentaion, mils | 11 | 12 | 6 | 6 | 8 | 9 | 8 | 7 |
| Residual Indentation, % | 19.3 | 22.8 | 12.1 | 16.6 | 17.4 | 19.9 | 17.5 | 17.6 |
| Sum of Initial Indentation and Residual Indentation | 30.3 | 34.8 | 18.1 | 22.6 | 25.4 | 28.9 | 25.5 | 24.6 |

[19] Styrene/ethylene/butylene/styrene block copolymer from Shell
[20] Polyether block amide from Atochem
*Unable to process into a sheet.

EXAMPLES 75 TO 78

It is possible to use a low or high amount of the silane-grafted polymer as is illustrated in Table 12.

TABLE 12

Widely varying levels of silane-grafted polymer.

| | Example No. | | | |
|---|---|---|---|---|
| | 75 | 76 | 77 | 78 |
| Silane-grafted EVA | 49 | 1 | 32 | 1 |
| Elvax 265 | 1 | 49 | 1 | 32 |
| Veramite | 20 | 20 | 20 | 20 |
| Iceberg Clay | 30 | 30 | 30 | 30 |
| Tensile Strength, psi. | 1445 | 1380 | 1733 | 1738 |
| Elongation, % | 111 | 280 | 30 | 80 |
| Cross-product of Tensile Strength & Elongation | 1604 | 3864 | 519 | 1390 |
| Initial Indentation, mils | 12 | 16 | 6 | 8 |
| Residual Indentation, % | 21.8 | 23.8 | 4.9 | 14.5 |
| Sum of Initial Indentation and Residual Indentation | 33.8 | 39.8 | 10.9 | 22.5 |

EXAMPLE 79

The compositions found in Table 13 illustrate smoke generation and flame spread properties. It is again surprising that the advantage that the silane-grafted EVA provides in flame spread is preserved even when blended with a greater than 1:1 ratio of conventional EVA. Commercial rubber products can produce smoke generation in an NBS smoke chamber test that range rom a low of 270 to as high as 567 overall corrected average. These results are as good as this only after significant quantities of fire retardants are used. The compositions of this invention provide excellent smoke generation performance without a single ingredient directed to smoke prevention.

TABLE 13

Fire performance properties.

| | Example No. | | |
|---|---|---|---|
| | C-13 | 79 | C-14 |
| Silane-grafted EVA | 33 | 15 | |
| Elvax 265 | | 18 | 33 |
| Veramite | 27 | 27 | 27 |
| Iceberg Clay | 40 | 40 | 40 |
| 30/30 Flame Spread[21] | 27 | 32 | 80 |
| NBS Smoke, overall average | 117 | 162 | 157 |

[21] 30-30 Tunnel Test -- The surface flammability of materials, in comparison with red oak flooring, is determined. The specimen is placed face down in the testing apparatus at a 30-degree incline with the specimen being heated and the ignition forced by a Fisher Burner placed under the lower surface of the specimen. The maximum flame length observed on the surface of the specimen is then used to calculate a flame spread rate.

EXAMPLES 80 TO 90

It is possible to utilize a wide variety of fillers. The compositions found in Table 14 illustrate the results that can be obtained. Blending of these fillers may also be desirable in optimizing a particular composition for a specific end use.

TABLE 14

Different fillers.

| | Example No. | | | | | | | | | | |
|---|---|---|---|---|---|---|---|---|---|---|---|
| | 80 | 81 | 82 | 83 | 84 | 85 | 86 | 87* | 88* | 89* | 90* |
| Silane-grafted EVA | 18 | 18 | 18 | 18 | 18 | 18 | 18 | 18 | 18 | 18 | 18 |
| Elvax 265 | | 22 | 22 | 22 | | | | 22 | 22 | 22 | 22 |
| Elvax 450 | 22 | | | | 22 | 22 | 22 | | | | |
| Cas-20[22] | | 60 | | | | | | | | | |
| Franklin Fiber[22] | | | 60 | | | | | | | | |
| Burgess No. 20[23] | | | | 60 | | | | | | | |
| Iceberg Clay | 26 | | | | | | | 33 | | | 30 |
| Alumina Trihydrate | 20 | | | | 60 | | | | | | |
| Fumed silica | | | | | | | | 3 | | | |
| Veramite | 14 | | | | | | | 24 | | | 20 |
| Gamasperse 80[24] | | | | | | 60 | | | | | |
| Mica[25] | | | | | | | | | | 60 | |
| Talc[26] | | | | | | | | | 60 | | |
| Translink HF-900[27] | | | | | | | 60 | | | | |
| Zeospheres 800[28] | | | | | | | | | | | 10 |
| Tensile Strength, psi. | 968 | 864 | 756 | 2393 | 1717 | 1275 | 2402 | | | | |
| Elongation, % | 130 | 269 | 262 | 65 | 42 | 32 | 39 | | | | |
| Cross-product Tensile Strength & Elongation | 1258 | 2324 | 1981 | 1555 | 721 | 408 | 937 | | | | |

TABLE 14-continued

| | Different fillers. | | | | | | | | | | |
|---|---|---|---|---|---|---|---|---|---|---|---|
| | Example No. | | | | | | | | | | |
| | 80 | 81 | 82 | 83 | 84 | 85 | 86 | 87* | 88* | 89* | 90* |
| Initial Indentation, mils | 28 | 18 | 16 | 7 | 7 | 7 | 7 | | | | |
| Residual Indentation, % | 34.4 | 34.7 | 42.6 | 12.7 | 12.8 | 25.3 | 5.6 | | | | |
| Sum of Initial Indentation & Residual Indentation | 62.4 | 52.7 | 58.6 | 19.7 | 19.8 | 42.3 | 12.6 | | | | |

*Physical properties not measured
[22]From U.S. Gypsum
[23]From Burgess Pigments Company
[24]Calcium Carbonate from Georgia Marble
[25]Wet ground, 325 mesh, from C. P. Hall
[26]Nytal 400 from R. T. Vanderbilt
[27]From Engelhard
[28]Silica-alumina ceramic hollow sphere from Zeelan Industries

What is claimed is:

1. A floor covering comprising a composition including a thermoplastic resin; said resin comprising a blend of a silane grafter polymer and an ungrafted polymer; said silane grafted polymer comprising more than 1% and less than 50% by weight of the blend; the polymer of said silane grafted polymer and said ungrafted polymer being a copolymer of ethylene with at least one non-ethylene monomer selected from the group consisting of vinyl esters of saturated carboxylic acids wherein the acid moiety has up to 4 carbon atoms, unsaturated mono- and dicarboxylic acids, and esters of said unsaturated acids wherein the alcohol moiety has 1 to 8 carbon atoms; the ethylene content of said copolymer being from about 40% to about 95% by weight; the non-ethylene monomer content of the copolymer being from about 5% to about 60% by weight; and the melt index of the copolymer being from about 0.1 to about 400; provided that when the copolymer of ethylene is an ethylene/vinyl ester or ethylene/unsaturated mono- or dicarboxylic acid ester copolymer the copolymer can contain up to about 15% by weight of carbon monoxide or sulfur dioxide.

2. The floor covering of claim 1 wherein the silane grafted polymer has a silane graft density of one graft per about 100 carbons to one graft per about 5000 carbons.

3. The floor covering of claim 1 wherein the silane grafted polymer is EVA.

4. The floor covering of claim 3 wherein the silane grafted EVA is from about 15% to about 30% by weight vinyl acetate.

5. The floor covering of claim 1 wherein the silane grafted polymer and the ungrafted polymer are the same polymer.

6. The floor covering of claim 5 wherein the polymer is EVA.

7. The floor covering of claim 1 wherein the copolymer has a non-ethylene monomer content of about 18 to about 28% by weight.

8. The floor covering of claim 1 wherein the composition further comprises a filler.

9. The floor covering of claim 1 wherein the composition further comprises about 30% to about 90% filler.

10. A floor covering comprising a resilient flooring sheet or a tile cut from a resilient flooring sheet, the resilient flooring sheet comprising a composition including a thermoplastic resin; said resin comprising a blend of a silane grafted polymer and an ungrafted polymer; the polymer of said silane grafted polymer and said ungrafted polymer being a copolymer of ethylene with at least one non-ethylene monomer selected from the group consisting of vinyl esters of saturated carboxylic acids wherein the acid moiety has up to 4 carbon atoms, unsaturated mono- and dicarboxylic acids, and esters of said unsaturated acids wherein the alcohol moiety has 1 to 8 carbon atoms; the ethylene content of said copolymer being from about 40% to about 95% by weight; the non-ethylene monomer content of the polymer being from about 5% to about 60% by weight; and the melt index of the copolymer being from about 0.1 to about 400; provided that when the copolymer of ethylene is an ethylene/vinyl ester or ethylene/unsaturated mono- or dicarboxylic acid ester copolymer the copolymer can contain up to about 15% by weight of carbon monoxide or sulfur dioxide.

11. A floor covering comprising a composition including a thermoplastic resin; said resin comprising a blend of a silane grafted polymer and an ungrafted polymer; the polymer of said silane grafted polymer and said ungrafted polymer being a copolymer of ethylene with at least one non-ethylene monomer selected from the group consisting of vinyl esters of saturated carboxylic acids wherein the acid moiety has up to 4 carbon atoms, unsaturated mono- and dicarboxylic acids, and esters of said unsaturated acids wherein the alcohol moiety has 1 to 8 carbon atoms; the ethylene content of said copolymer being from about 40% to about 95% by weight; the non-ethylene monomer content of the copolymer being from about 5% to about 60% by weight; and the melt index of the ungrafted polymer being from about 1 to about 10; provided that when the copolymer of ethylene is an ethylene/vinyl ester or ethylene/unsaturated mono- or dicarboxylic acid ester copolymer the copolymer can contain up to about 15% by weight of carbon monoxide or sulfur dioxide.

* * * * *